W. C. MUNDAY.
REVERSIBLE GEAR MECHANISM.
APPLICATION FILED MAR. 11, 1916.

1,207,606.

Patented Dec. 5, 1916.
2 SHEETS—SHEET 1.

Inventor
W. C. Munday
By
N. S. ...
Attorney

W. C. MUNDAY.
REVERSIBLE GEAR MECHANISM.
APPLICATION FILED MAR. 11, 1916.

1,207,606.

Patented Dec. 5, 1916.
2 SHEETS—SHEET 2.

Inventor
W. C. MUNDAY
By
Attorney

UNITED STATES PATENT OFFICE.

WILLIAM CHESTER MUNDAY, OF CARTERVILLE, MISSOURI.

REVERSIBLE GEAR MECHANISM.

1,207,606.  Specification of Letters Patent.  Patented Dec. 5, 1916.

Application filed March 11, 1916. Serial No. 83,573.

*To all whom it may concern:*

Be it known that I, WILLIAM CHESTER MUNDAY, a citizen of the United States, residing at Carterville, in the county of Jasper, State of Missouri, have invented a new and useful Reversible Gear Mechanisms; and I do hereby declare the following to be a full, clear, and exact description of the invention, such as will enable others skilled in the art to which it appertains to make and use the same.

The present invention relates to a reversible clutch mechanism for belt pulleys, and has for its object to provide a device of this character which embodies novel features of construction whereby the direction of rotation of the belt pulley can be reversed when desired.

Further objects of the invention are to provide a device of this character which is simple and inexpensive in its construction, which can be readily applied to any belt pulley, which can be easily manipulated, and which is dependable in its action.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1:
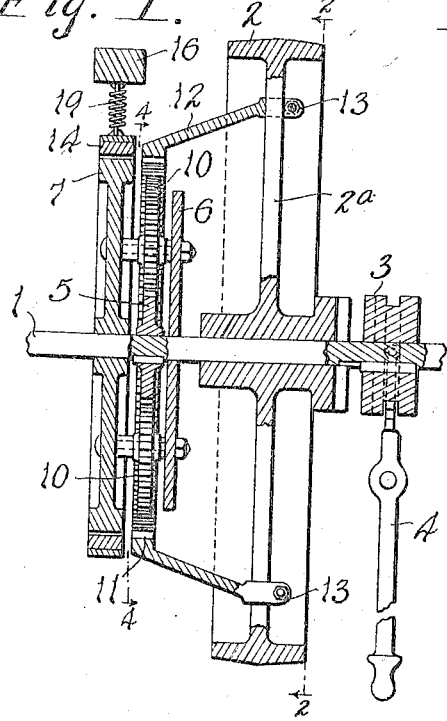
Figure 5:
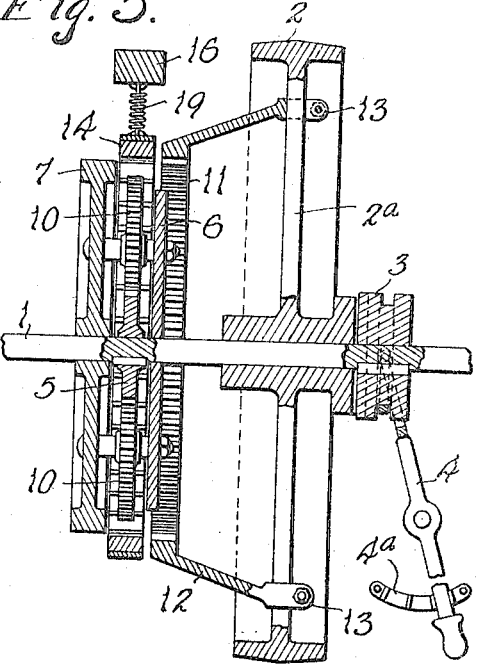
Figure 2:
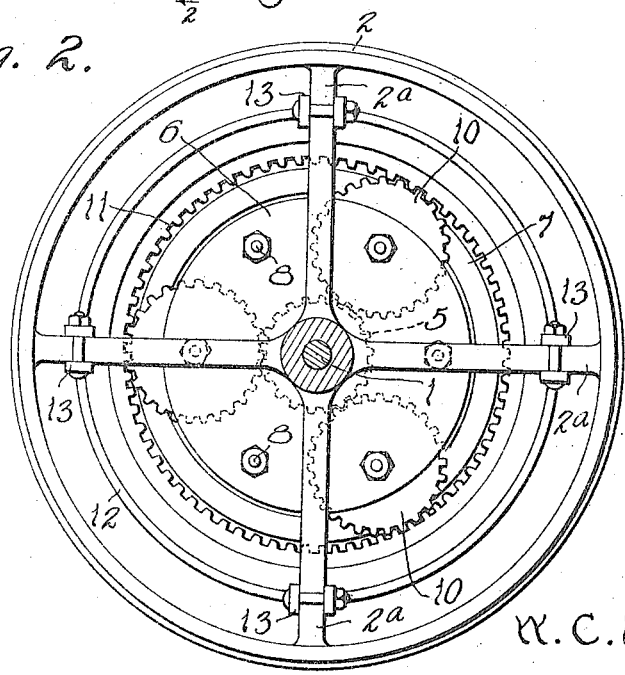
Figure 3:
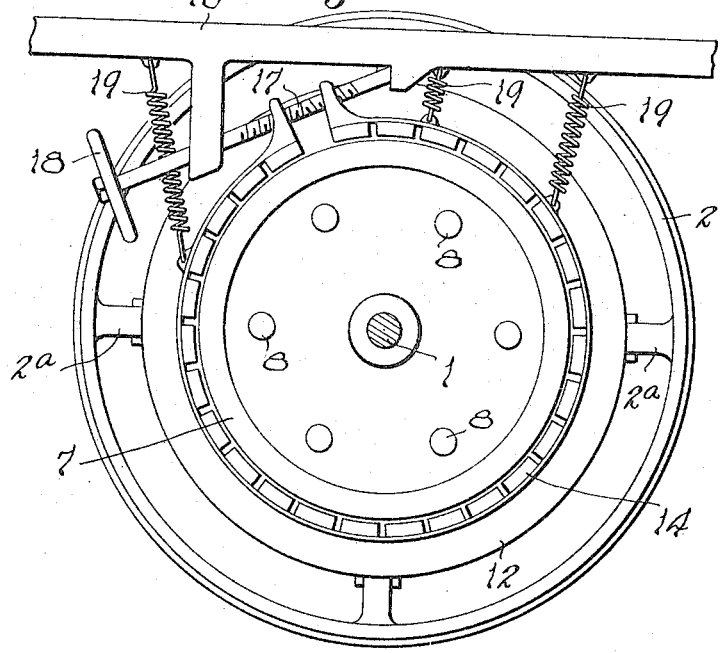
Figure 4:
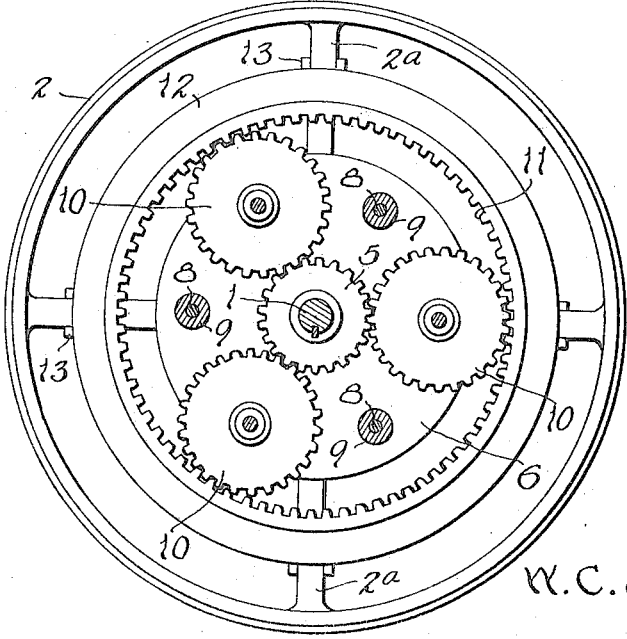

Figure 1 is a vertical longitudinal sectional view through a reversible clutch constructed in accordance with the invention. Fig. 2 is a transverse sectional view taken on the line 2—2 of Fig. 1 and looking in the direction of the arrows. Fig. 3 is an end view thereof looking in a direction opposite to that of Fig. 2. Fig. 4 is a transverse sectional view taken on the line 4—4 of Fig. 1, and looking in the direction of the arrows. Fig. 5 is a view similar to Fig. 1 showing a slight modification of the invention.

Corresponding and like parts are referred to in the following description and indicated in all the views of the drawings by the same reference characters.

Referring to the drawings, the numeral 1 designates the drive shaft upon which the belt pulley 2 is loosely mounted. Upon one side of the pulley any suitable form of clutch 3 may be provided for locking the pulley with the drive shaft when a direct or forward drive thereof is desired. The usual shifting lever 4 is shown as provided for operating this direct clutch. No claim to novelty is made upon this direct clutch, and any conventional form of clutch may be employed. Upon the opposite side of the belt pulley 2 a pinion 5 is keyed upon or otherwise rigidly applied to the drive shaft 1. A plate 6 is loose upon the drive shaft on one side of the pinion 5, while a disk 7 is loose upon the drive shaft on the opposite side of the said pinion, the said plate 6 and disk 7 being connected at intervals by suitable fastening members such as the bolts 8, and being maintained in a properly spaced relation by suitable spacing block 9. Journaled between the plates 6 and disk 7 is an annular series of gear wheels 10 which mesh with the pinion 5 of the drive shaft 1, and also mesh with a large annular rack 11 carried by a frusto-conical ring 12 which has the base thereof rigidly secured by suitable clamps 13 to the spokes 2ª of the belt pulley 2. On the direct drive this entire mechanism revolves with the drive shaft 1 and belt pulley 2, so that there is no relative rotation of the parts.

Surrounding the disk 7 is a brake band 14 which is supported from a transverse beam 16. A screw 17 operatively connects the ends of the brake band so that it can be tightened upon the disk 7 when it is desired to lock the disk against rotation. A suitable handle 18 is provided at the end of the screw for operating the same, and springs 19 connect the upper part of the brake band at intervals to the transverse beam 16 so as to hold the band out of engagement with the disk 7 when it is loose thereon. When it is desired to reverse the direction of rotation of the belt pulley 2, the main clutch 3 is opened and the brake band 14 tightened so as to lock the disk 7 against rotation. The gear wheels 10 which are interposed between the pinion 5 and the large annular rack 11 will then operate to rotate the belt pulley in a backward direction.

A slight modification is shown by Fig. 5, in which the main shaft 1 is mounted to have a slight longitudinal movement to admit of the gear wheels 10 of the reversing mechanism being moved out of mesh with the large internal rack 11. For this purpose the clutch member 3 will be rigidly applied to the shaft 1, and a rack 4ª provided for locking the shifting lever 4 in either one of three positions. When the shifting lever 4 is in an intermediate position the direct clutch 3 is open and the gear wheels 10 are also out of mesh with the large internal rack 11 so that the belt pulley 2 is loose upon the drive shaft. When the shifting lever 4 is moved to close the direct clutch 3, the gear wheels 10 are moved farther away from the large rack 11, although when the shifting lever 4 is moved in the opposite direction the gear wheels 10 are brought into mesh with the large rack 11. The brake band 14 can then be tightened to reverse the direction of rotation of the belt pulley 2. With this arrangement it is impossible to close the direct clutch when the reversing gear is in mesh, and all danger of stripping the gear or injuring the parts through careless operation is avoided.

Having thus described the invention, what I claim as new and desire to secure by Letters Patent, is:—

1. A device of the character described including a slidably mounted drive shaft, a pulley loose thereon, a direct drive clutch on one side of the pulley, a reversing gear on the opposite side of the pulley, and means for moving the members of the reversing gear out of mesh with each other when the direct drive clutch is closed.

2. A device of the character described including a slidably mounted drive shaft, a pulley loose thereon, a direct drive clutch on one side of the pulley, the drive shaft being moved longitudinally as the clutch is opened and closed, a reversing gear arranged on the opposite side of the pulley and including gears carried by the shaft and pulley respectively, said members being automatically moved out of mesh with each other when the direct drive clutch is closed.

3. A device of the character described including a slidably mounted drive shaft, a pulley loose thereon, a direct drive clutch including a member rigid with the shaft so that the shaft is moved longitudinally as the clutch is opened and closed, a pinion rigid with the shaft, a disk loose on the shaft and slidable therewith, gear wheels journaled upon the disk and meshing with the pinion, a large internal gear carried by the pulley, the gear wheels being moved out of mesh with the large internal gear when the direct drive clutch is closed, and a brake band for the disk.

4. A device of the character described including a slidably mounted drive shaft, a pulley loose upon the drive shaft, a direct drive clutch including a sliding member rigid with the shaft, a shifting lever controlling the direct drive clutch and also moving the shaft, a pinion rigid with the shaft, a disk loose on the shaft and slidable therewith, a series of gear wheels journaled upon the disk and meshing with the pinion, a large internal gear carried by the pulley and adapted to mesh with the gear wheels, and a brake band for the disk, the gear wheels being out of mesh with the large internal gear at all times except when the shifting lever is moved into a predetermined position.

In testimony whereof I have signed my name to this specification in the presence of two subscribing witnesses.

WILLIAM CHESTER MUNDAY.

Witnesses:
B. M. CLARK,
ROY CARTER.

Copies of this patent may be obtained for five cents each, by addressing the "Commissioner of Patents, Washington, D. C."